United States Patent [19]

May et al.

[11] Patent Number: 4,555,091

[45] Date of Patent: Nov. 26, 1985

[54] EFFICIENT LIGHTWEIGHT HOIST WITH MULTIPLE-CABLE-SIZE TRACTION AND SAFETY SYSTEMS

[75] Inventors: Marvin M. May; Robert C. Billings, both of Los Angeles; Harry A. Kendall, Granada Hills; Jeffrey T. Bayorgeon, Walnut, all of Calif.

[73] Assignee: Power Climber, Inc., Los Angeles, Calif.

[21] Appl. No.: 508,074

[22] Filed: Jun. 23, 1983

[51] Int. Cl.[4] .......................... B66D 5/18; B66D 5/20; F16H 1/28

[52] U.S. Cl. .................................... 254/267; 188/65.1; 254/333; 254/356; 254/378

[58] Field of Search ................ 254/267, 333, 342, 356, 254/373, 371, 383; 74/805; 188/65.1; 182/5

[56] References Cited

U.S. PATENT DOCUMENTS

| | | | |
|---|---|---|---|
| 1,876,954 | 9/1932 | Johnson | 74/805 |
| 2,544,086 | 3/1951 | Herrington | 188/65.1 X |
| 3,231,240 | 1/1966 | Naito | 254/333 |
| 3,302,932 | 2/1967 | Wallin | 254/371 X |
| 3,944,185 | 3/1976 | Evans | 254/378 |
| 4,139,178 | 2/1979 | Hippach | 254/333 X |
| 4,194,415 | 3/1980 | Kennington et al. | 74/805 |
| 4,254,941 | 3/1981 | Tanson | 254/267 |
| 4,338,831 | 7/1982 | Rodaway | 74/805 |

FOREIGN PATENT DOCUMENTS

| | | | |
|---|---|---|---|
| 2307370 | 8/1974 | Fed. Rep. of Germany | 254/333 |
| 2095202 | 9/1982 | United Kingdom | 254/267 |

*Primary Examiner*—Stuart S. Levy
*Assistant Examiner*—Joseph J. Hail, III
*Attorney, Agent, or Firm*—Romney Golant Martin & Ashen

[57] ABSTRACT

This scaffold hoist uses a transmission mechanism whose output shafts are fastened to the hoist housing, and whose case rotates, carrying a sheave which impels the mechanism along the cable. The transmission mechanism is advantageously a quadrant drive for extremely high torque-to-weight ratio.

The sheave has a peripheral groove, tapered and deep enough to seat a cable having any of three different diameters, at different depths in the groove.

The cable wraps around three-quarters of the sheave. Around five-eighths of the sheave, a chain presses the cable into the groove. The chain rollers enter the groove deeply enough to engage even the smallest-diameter cables of interest, while clearing the sheave periphery. The chain side bars ride along the sides of the sheave, holding the chain and cable in position.

A resettable overspeed brake uses a rotary cam that jams a cable of any of the three sizes, at correspondingly various cam angles. The cam is cocked out of contact with the cable, and immediately spring-driven against the cable when triggered by a centrifugal sensor. A backup block—which keeps the cable from retreating from the cam—slides away from the cable at an angle during resetting, to facilitate unjamming the cable by moderate force.

10 Claims, 13 Drawing Figures

EFFICIENT LIGHTWEIGHT HOIST WITH MULTIPLE-CABLE-SIZE TRACTION AND SAFETY SYSTEMS

BACKGROUND

1. Field of the Invention

This invention relates generally to devices for drawing cable or rope, and more particularly to power hoists for raising and lowering scaffolds and the like along a cable or a wire rope.

2. Prior art (a) General history: The basic patent in this area is U.S. Pat. No. 3,231,240, which issued in 1966 to Ichinosuke Naito. It describes the concepts of using a chain-like member to press the cable into a peripheral groove in a driven sheave to obtain traction between the cable and the sheave, and applying the weight of the load to tension the chain-like member so that the traction on the cable is proportional to the load. The Naito patent was directed to stretching or moving the cable through the apparatus, with the tacit assumption that the apparatus was stationary.

Naito's invention, essentially the first generation of devices of its kind, made it possible to reliably tension and move cable of any length, without need of a drum on which to wind and store the cable. The improvement in bulk and weight were significant.

Many applications of this basic invention have since been developed. One line of such applications is the development of hoists for the movable scaffolds used in constructing and maintaining many kinds of structures, such as ships, bridges, dams and—most frequently—the exteriors of tall buildings. Such a scaffold moves up and down along cables or wire ropes that are anchored to the top of the particular structure. Generally unchanged are the basic principles of drawing the cable through the apparatus and pressing the cable into a peripheral sheave groove proportionally to the load. Here, however, what is stationary is the cable, and what moves is the apparatus—the hoist mechanism, a motor to power it, and of course the scaffold and its cargo and crew.

Among the patents directed to application of the Naito principles to scaffold hoists are U.S. Pat. No. 3,944,185, which issued in 1976 to Michael Evans, and U.S. Pat. No. 4,139,178, which issued in 1979 to Wilburn Hippach. The Evans patent introduced several features aimed at this specialized application—in particular, a secondary sheave used for at least three distinct purposes. One of these purposes was to tension the traction chain from both ends rather than only one end. Another purpose was to act as the driving end of a gear train to develop a mechanical output signal indicative of cable speed, for use in an automatic overspeed braking system. Yet another purpose was to help guide the unloaded end of the cable out of the apparatus.

Hippach provided further refinements directed to the reliability (particularly reliability under extreme operating conditions) and the convenience in use of the apparatus. The Hippach patent describes subtle features of the overspeed-brake gear train, designed to ensure smooth operation of the mechanism under extremely high accelerations; and also describes what could be called spring-preloading of the secondary sheave, to facilitate automatic reeving or "threading" of the cable through the apparatus.

Thus these patents may be regarded as the second generation of cable-drawing equipment developments, in the scaffold-hoist field. They were directed to producing optimum performance in terms of reliability and convenience.

Modern users of industrial equipment, however, demand more than this. The present age is extremely conscious of the usage of energy, particularly nonrenewable energy sources. The modern age is also extremely conscious of the usage of materials, particularly metals.

It has therefore become a matter of paramount concern to all manufacturers, and certainly to manufacturers of scaffold hoists, that apparatus be efficient in terms of energy usage, and that its construction use no more material than need be—while remaining just as reliable and convenient as before.

(b) Hoist weight considerations: Such concerns of course render it undesirable to construct hoists that are relatively heavy. Past hoists have not been greatly overweight, of course, and they have been the state of the art.

Still, under the modern conditions outlined above they may not have been optimum, both because of the relatively large amounts of metal that must go into their construction and because of the continuing costs of hoisting their own weight—to the extent of whatever "excess" weight they may have.

(c) Multiple-cable-size considerations—efficiency: Perhaps less plain, but equally significant in terms of energy and materials efficiency, is the undesirability of making several different models of hoists for use with cables of different sizes. It has been a standard practice in the hoist industry to make either different models, or models with different modules, for use with cables of different sizes.

The use of cables of different sizes arises from the various loads which scaffolds must carry, and to some extent from variety in the local safety statutes with which users must comply, and also from the special circumstances and preferences of users. Thus it is neither possible nor particularly desirable to eliminate nonuniformity of cable sizes in use.

Yet there are many inefficiencies in the practice of manufacturing different hoists for the different cable sizes. Such inefficiencies extend through warehousing, spare-parts maintenance, billing and bookkeeping systems, and communications complexity all along the distribution chain from manufacturer to user. In addition, for a user who wishes to use cables of different sizes within his own operations, for different scaffolding purposes, the expense and inconvenience of having to own more than one hoist model or module are particularly salient.

(d) Multiple-cable-size considerations—reliability of performance: For such a user the problems arising from ownership of different hoist equipment can also pose a procedural problem: constant vigilance must be exercised when personnel have been using one cable size and switch to another, to be sure that the right hoist has been selected for use with that other cable size—or, even more insidiously, to be sure that the right cable-size-dependent module has been selected.

Interestingly enough, the area in which cable-size-dependent modules have most prominently been introduced is the area of overspeed brakes. The practice of providing different brake components for use with different cables is particularly unfortunate in view of the fact that overspeed brakes, by their nature, are not actually placed into service until an overspeed condition (i.e., emergency) occurs.

Generally speaking, if a hoist being used with a cable of small diameter has attached to it a brake designed for use with a cable of large diameter, the hoist will operate to drive the scaffold up and down the cable; there is nothing inherent in the mismatch, but only the user's watchfulness, to prevent the user from proceeding—but generally if an emergency arises the brake will not work at all. In some cases the same problem is present when using a large-diameter cable and a brake designed for a small-diameter cable.

(e) Power-transmission systems: In another field, the field of mechanical power-transmission devices, certain basic developments have arisen which have never been used in hoists. U.S. Pat. No. 4,194,415, which issued in 1980 to Frank Kennington and Panayotis Dimitracopoulos, describes a "quadrant drive" system.

This system provides mechanical motion transmission with a large mechanical advantage, using extremely lightweight construction by comparison with conventional gear trains. Yet the quadrant drive has all the load-bearing and torque-transmitting capability of the heavier conventional gearing.

The quadrant drive accomplishes this by using an eccentric gear-like input drive wheel that drives a multiplicity of small drive pins at the periphery of the wheel. The drive pins are constrained to follow an ovoid path, about half of which path follows the teeth on the eccentric wheel (so that the drive pins are engaged with the teeth on the eccentric wheel), and the other half of which path is spaced away from those gears. The pins are simultaneously constrained to move in radial slots—or to bear against other drive-pin-engaging elements—in another wheel or plate.

Some manufacturers have introduced devices related to the quadrant drive, such as the Graham Company's "circulute reducer". The principal developer of the quadrant drive has been the Swiss firm Plummettaz S. A.

In some quadrant-drive devices the pins are always engaged with this second plate, and in others they are engaged with this second plate at least whenever they are on that part of their path which follows the teeth on the eccentric wheel. Moreover, as already mentioned, they are about half the time engaged with the eccentric wheel; thus the driving load is at all times borne by about half the pins, and by about half the teeth of the eccentric drive wheel, and by about half the radial slots (or other drive-pin-engaging elements) of the driven plate—rather than by only two or three gear teeth.

The result is a great improvement in torque-to-weight ratio, since a much more lightweight construction may be used to obtain the same load-bearing and torque-transmitting capability.

By their nature, however, quadrant (or circulute) drives are relatively bulky, and somewhat cumbersome to use in portable equipment—particularly equipment, such as scaffold hoists, in which space is at a distinct premium. If others in the hoist industry have taken note of the quadrant drive (and we have no indication that such an event has occurred) perhaps they may have been deterred by the seeming awkwardness of mating the lightweight—but somewhat cumbersome—quadrant drive to the traditionally and ideally compact scaffold hoist.

At least two other complications tend to teach away from the concept of using quadrant or circulute drives in scaffold hoists. First, such drives provide a mechanical advantage ratio that is—while relatively high for a single stage—somewhat limited in comparison with an entire conventional gear train. Typical single-stage commercial units have ratios no higher than sixty or seventy to one. Of course two-stage units (two quadrant drives connected in series) produce extremely high reduction ratios, as large as the square of the ratio produced by highest-ratio single-stage units—some 5000 to one. Two-stage units, however, would be all the more bulky and awkward, and for scaffold-hoist applications would lose a great deal of the torque-to-weight ratio advantage of the single-stage units.

Second, the mechanical advantage of a quadrant drive is not readily modified; that is to say, the drive has a mechanical advantage that is quite firmly built into the device. (In a conventional gearbox, by contrast, changing two spur gears at one end of the train or the other can provide desirable refinements of the overall reduction for particular applications.) Thus, even if quadrant drives were available with high enough single-stage reductions for scaffold hoists, their use in such applications would require hoist manufacturers (and some users) to stock and service a variety of drives with various reductions, to satisfy the gearing requirements of different hoist applications.

(f) Summary: The foregoing comments show that there has been a need in the scaffold-hoist industry for a third generation of hoists, substantially lighter in weight than those of the second generation but just as convenient and reliable, and capable of accommodating any of several different cable sizes without change of hoist—or hoist components. This need arises from considerations of energy and materials efficiency, and efficiency in general, and also from considerations of reliability in use.

These comments also show that the quadrant or circulute drive has some tantalizing benefits for the scaffold-hoist industry, but that certain inherent characteristics and certain commercial characteristics of the quadrant drive have seemed to make it incompatible with the requirements of such hoists.

SUMMARY OF THE INVENTION

The present invention is directed to a third generation of scaffold-hoist equipment. It provides an efficient, lightweight hoist, which therefore requires considerably less power to operate, and less manpower to move around when on the ground. It nevertheless has all the torque of previous models and is just as sturdy.

Moreover, this invention makes it possible for just one hoist model to be used for three or even more different cable diameters, an improvement which produces very significant economies in construction, warehousing, distribution and maintenance, as well as giving users more options for the use of their equipment.

The hoist of this invention has a housing in which and to which the other components are mounted.

This hoist also has a power transmission mechanism, which includes a case, an output drive shaft an input drive shaft, and some means of speed reduction connected between the input and output drive shafts. The output drive shaft, when driven, rotates relative to the case.

In accordance with the present invention, however, the output shaft is secured to the hoist housing, so that in use the case of the transmission mechanism rotates relative to the hoist housing. Furthermore, the hoist of this invention also has a cable-driving sheave that is secured to and rotated by the case of the transmission mechanism.

Since the sheave and the case must both be of relatively large diameter, in comparison with the input and output drive shafts of the quadrant drive, fixing the sheave to the case of the quadrant drive is a particularly beneficial arrangement. With this arrangement it is not necessary to provide a hub for the sheave, or to provide spokes or an intermediate annular portion between a hub and the periphery of the sheave. It is only necessary to provide the peripheral portion of the sheave—the outer grooved portion which drives the cable—as this outer portion can be bolted directly to the rotary case of the transmission mechanism.

Yet at the same time the output shaft of the transmission mechanism, or more accurately its two output shafts at its two ends, are readily mounted to the housing of the hoist, to effect a very firm attachment. Preferably both output shafts are positioned in mating apertures in the housing so that the transmission mechanism is held at both ends, but for simplicity and economy only one shaft is secured against rotation relative to the housing. One of the output shafts is concentric with the transmission-mechanism input drive shaft; advantageously it is this particular output-drive-shaft section that is secured against rotation relative to the corresponding housing wall.

It is advantageous to use a quadrant drive as the transmission mechanism in this system. The quadrant drive provides a combination of relatively lightweight construction and full torque-handling capability that is favorable for use in scaffold hoists. Moreover, the mounting system already described—in which the output shaft or shafts are secured to the hoist housing while the transmission-mechanism case rotates, carrying the sheave—tends to overcome the slight awkwardness of the quadrant drive in the context of a scaffold hoist.

Drive means are also included for applying torque to the input drive shaft of the transmission mechanism. These drive means include a motor (not necessarily electrical).

If the transmission mechanism is a quadrant drive, the drive means also preferably include a conventional speed-reduction mechanism mounted to the housing and transmitting such torque from the motor to the input shaft of the quadrant drive. This speed reducer advantageously is made up of a pair of spur gears, supplying roughly a two-to-one mechanical advantage—or, better yet a pair of spur gears that can be factory selected to supply approximately a two-to-one mechanical advantage or to supply other values of mechanical advantage appropriate for variant versions of the system.

This concept of using a hybrid power train (quadrant drive for sixty-to-one reduction, and conventional gearing for two-to-one additional reduction) has several advantages. It permits use of a standard commercial quadrant-drive model. It also adds only very slight additional weight in the single added gear stage, so that even though the torque-to-weight ratio of the two-to-one reducer is not as favorable as that in the quadrant drive, the overall detrimental impact is negligible. It also provides a part of the overall reduction mechanism in which fine-tuning of the total mechanical advantage can be selected to suit the particular application at hand—merely by selecting and installing any of various standard commercial gear pairs.

It should be noted that if a user mistakenly uses a hoist that has a gear pair that is inappropriate for the load, in greatest likelihood the scaffold will merely (1) operate too slowly, if the gearing is too high, or (2) not raise the load, if the gearing is too low. Either of these results will presumably be self-correcting, in the sense of calling the user's attention to the error.

(In the worst circumstances that are at all likely, a user might use a hoist with gearing ratio high enough to permit raising the load, but so low as to lug the motor. If the user does not observe that the scaffold is moving slowly and that the motor is overheating, conceivably this condition could result in burning out the motor. If this occurs, and the motor-overload section of the control circuit fails too, one end of the scaffold might fall quickly enough to actuate the overspeed brake. Even this worst-case possibility, though plainly to be avoided, does not in itself pose the kind of intense hazard discussed earlier in regard to variable overspeed-brake modules.)

The cable-driving sheave has a tapered groove defined in its periphery. A cable in use is pressed into this groove, with force proportional to the load on the cable, to such a depth that the frictional force between the cable and the walls of the groove is sufficient to ensure adequate traction for the load.

The total depth of this groove is made sufficient to accommodate any of a selected multiplicity of cable diameters, by seating of the cables at a corresponding multiplicity of positions relative to the total groove depth. In other words, cables of different diameters seat at different depths in the groove. (In previous hoists, sheaves were provided with tapered grooves, and the groove depth was sufficient to accommodate the range of forces required for a single cable size; this condition remains in the present invention, but the depth must be even greater because of the need to seat small-diameter cables in a narrow region nearer the bottom of the groove, and large-diameter cables in a wide region nearer the top of the groove.)

The hoist of the present invention also has some means for guiding cables into the groove of the sheave. These guiding means are fixed relative to the hoist housing, and may take the form of an entry aperture in the top of the housing, together with suitable contouring of the housing interior. More elaborate provisions, such as a diverter block, may be made if desired.

In addition the hoist of the present invention has some means for supporting at least one end of a scaffold or like load. These means are coupled to the housing, but the coupling may be either direct or indirect. For example, the scaffold-supporting means may be in essence a hook firmly attached to the base of the hoist housing, for attachment of the scaffold; in this case, to press the cable into the groove of the sheave with a force proportional to the load on the cable, some separate arrangement must be provided for determining the tension on the cable.

Alternatively the scaffold-supporting means are coupled to the hoist housing indirectly—through the intermediary of the mechanism which presses the cable into the groove of the sheave. In this way the weight of the scaffold, equipment and personnel are applied directly to that latter mechanism, and a simpler overall configuration results. This alternative will be illustrated and described in some detail, below.

As to the mechanism which presses the cable into the groove, the hoist of the present invention also includes a chain-like member that is disposed around a certain portion of the circumference of the sheave. This chain-like member is connected—in one of the manners described above—to be tensioned by whatever weight is suspended from the scaffold-supporting means, and is adapted to press the cable into the groove of the sheave.

The chain-like member has a multiplicity of rollers that are disposed in a sequence around the portion of the sheave circumference just mentioned. Each roller is enlarged in diameter at its center to extend into the groove of the sheave—and diminished in diameter at its ends to clear the extreme periphery of the sheave, when any of the selected multiplicity of cable diameters is in use. That is to say, each roller has a large enough diameter at its center, and a small enough diameter at its ends, that it can engage and effectively compress into the tapered groove even the smallest-diameter cable (of those for which the apparatus is intended), seated near the bottom of the groove, while clearing the outer rim of the sheave.

The chain-like member also has a multipicity of side bars, with holes defined in their ends for journalling of the ends of the rollers and for connecting adjacent rollers together. The combination of rollers and side bars thus in fact connects the adjacent rollers in a continuous configuration to function analogously to a chain—that is, to sustain tension applied to the two ends of the chain-like element. Each side bar is disposed axially outboard of the sheave, at one side or other of the sheave, to axially clear both the periphery and the side of the sheave.

The side bars advantageously extend radially inward, from the periphery of the sheave toward the center of the sheave, and thereby capture the sheave closely between them. This construction opposes any tendency for the chain-like member to ride axially off the sheave, and also opposes any tendency for the cable, even if it is damaged, to escape from the sheave. The advantages of this construction are considered particularly useful under adverse circumstances, such as severe accelerations or other violent stresses acting upon the mechanism.

The best system known for applying the weight of the scaffold and its load to tension the chain-like member makes use of two levers in series. The system also has some means for securing one end of the chain-like member to the housing. The first lever is rotatably fixed to the housing and secured to the other end of the chain-like member. The second lever, also rotatably fixed to the housing, has the scaffold-supporting means depending from it and is pivotally secured to the first lever. Thus in this case the coupling of the scaffold-supporting means to the housing is indirect, via the chain-like member.

With this configuration, the weight suspended from the scaffold-supporting means is applied to the second lever, and thereby to the first lever, and thereby in turn to the chain-like member. The weight and the two levers thus apply tension to the chain-like member in proportion to the magnitude of the weight, the constant of proportionality being determined by the relative dimensions of the lever arms.

Furthermore, the operation of this system and the overall performance of the hoist as well as its compactness can be optimized by arranging the housing features and the levers as follows. The housing should have a cable-entry point that is substantially aligned along a plumb line tangent with the periphery of the sheave. The housing also provides a route for the cable which passes from the entry point downward into tangential engagement with the sheave, and remains in engagement around substantially three-quarters of the circumference of the sheave to a point generally above the center of the sheave. The chain-like member is secured to the housing at a point very nearly above the center of the sheave.

The first lever is secured to the chain-like member at a point approximately halfway—following along the periphery of the sheave—between the bottom of the sheave and the tangent point of the plumb line with the periphery of the sheave. The chain-like member, consequently, engages the cable around generally five-eighths of the circumference of the sheave, to press the cable into the sheave groove along this entire distance. The second lever is pivotally secured to the first lever at a point that is at most only very slightly outboard, relative to the sheave, from the plumb line mentioned earlier. The other linkage points are all inboard from the outboard pivot point just mentioned. This geometry satisfies the desired condition that the scaffold-supporting means be suspended at a point substantially along the plumb line from the entry point, without necessitating extension of the mechanism significantly outboard from that plumb line.

The hoist of the present invention also has a resettable overspeed brake that is mounted to the hoist housing. The brake has some means for sensing the cable speed. These sensing means are adapted and disposed to respond to the velocity of the cable relative to the housing, and to provide an actuating signal. This signal may be mechanical, or electrical, or may take other forms. The brake also has an automatic trigger that is mounted to the housing, and is positioned and adapted to be actuated by the signal from the cable-speed sensing means.

The brake also has a cam that is rotatably mounted to the housing. This cam is provided with some means for spring-loading it into a cocked position out of contact with the cable. These spring-loading means are anchored against the housing. The cam is adapted to be released by the trigger, to rotate into contact with the cable.

The cam has a range of diameters sufficient to accommodate any of the selected multiplicity of cable diameters.

In use, when the overspeed mechanism actuates the trigger, the trigger allows the cam to be rotated by the spring-loading means into a position in which the cam jams the cable against a backup block. The cam has a range radii sufficient not only to provide the necessary wedging or jamming action against the cable, but also sufficient to provide such action for any of the cable sizes of interest.

Thus, as with the extended depth of the sheave groove, the innovation in this area may be seen as *extending* the range of dimensions from that required for operation with a single cable size to that required to accommodate multiple cable sizes. The cam acts upon cables of different sizes identically, except that the cam rotates further to engage smaller cables, and rotates less far to engage larger cables.

In other words, the rotary cam jams a cable of any of the sizes for which the device is intended, at correspondingly various rotary positions of the cam, or cam angles.

The previously mentioned backup block—which keeps the cable from retreating from the cam—slides away from the cable at an angle during resetting, to facilitate unjamming the cable by moderate force. It is spring-loaded in the opposite direction, to ensure that if the overspeed trigger operates the backup block will be close enough to the cable to back up the cable and thereby promote the jamming action of the cam.

Using the principles outlined above, a single apparatus could be economically constructed to accommodate a great many different cable sizes with excellent performance. Based on the cable sizes currently in popular use for scaffold hoists, however, it is considered preferable to provide a hoist according to the present invention that is capable of use with three standard metric cable diameters—eight, nine, and ten millimeters. For all practical purposes, eight- and ten-millimeter cables are equivalent to five-sixteenths- and three-eighths-inch cables, these being standard cable diameters in the U.S. (formerly Imperial) system of measure.

Of course the hoist of our invention operates equally as well with cables having any diameter between eight and ten millimeters, but such cables are rarely encountered.

All of the foregoing operational principles and advantages of the present invention will be more fully appreciated upon consideration of the following detailed description, with reference to the appended drawings, of which:

BRIEF DESCRIPTION OF THE DRAWINGS

FIG. 3 *a* is a block diagram, also including some electrical details, showing the mechanical and electrical connections to a primary-brake system that is a part of that same embodiment.

FIG. 10 is a similar elevation showing the FIG. 9 braking system from the left side (as viewed in FIG. 1) —that is, from the same viewpoint from which FIG. 2 is taken.

DETAILED DESCRIPTION OF THE PREFERRED EMBODIMENTS

1. GENERAL ORIENTATION

Figure 1:
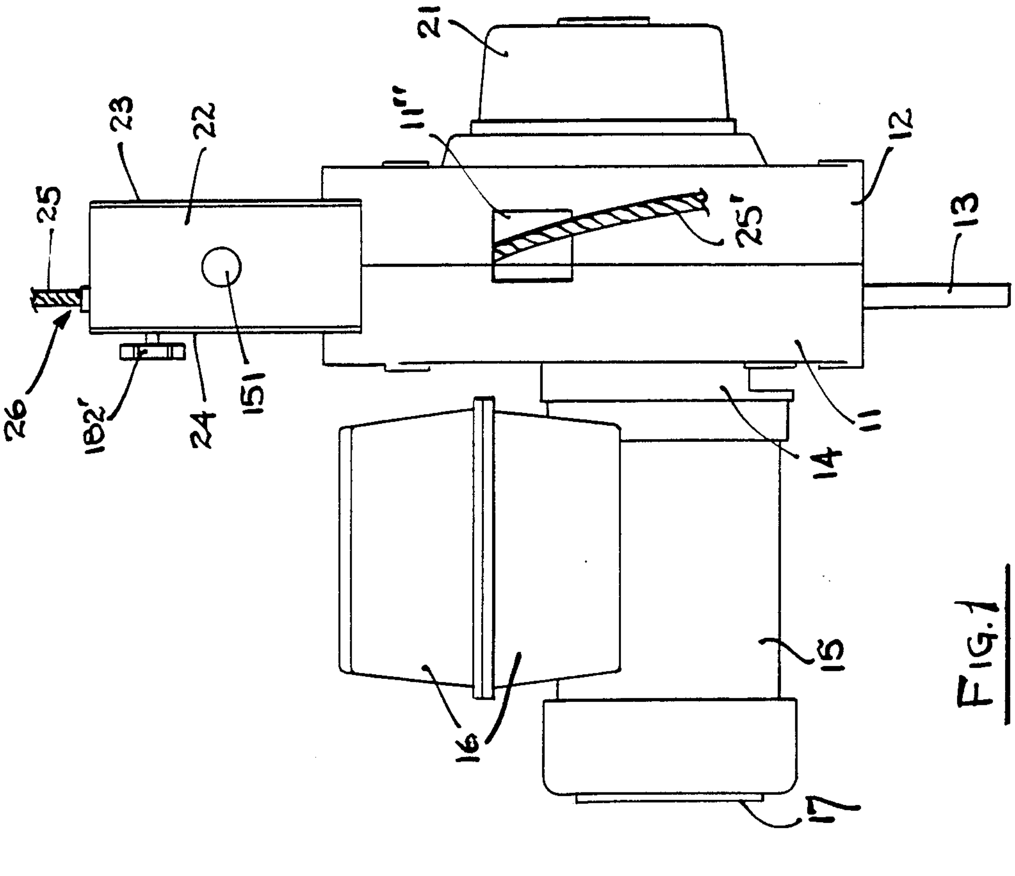
FIG. 1 is a front elevation of the exterior of a scaffold hoist that is a preferred embodiment of the invention.

As seen in FIG. 1, the present invention provides a scaffold hoist that includes a housing having two sections —a leftward housing section 11 and a rightward housing section 12—which enclose most of the power-transmission and traction portions of the hoist. A stirrup or hook 13 hangs below the leftward housing section 11 for attachment of the scaffold (or other like load).

Attached to the left side of the leftward housing section 11 is a preliminary speed-reducer section 14, which is part of the drive means of the hoist. Attached to the left of the preliminary speed-reducer 14 is a motor 15, which may be electrical, pneumatic or even hydraulic. The end grille 17 provides needed ventilation if the motor 15 is electrical.

Conveniently secured to the casing of the motor 15 is an electrical control box 16, on which is mounted in turn an "up/off/down" power switch 16' for controlling the motor.

A primary brake assembly 21 is secured to the rightward hoist-housing section 12. This brake is controlled by the "up/off/down" power switch, in reverse parallel with the motor 15—so that the primary brake is on whenever the apparatus is not set to power upward or downward along the cable 25.

Mounted to the top of the housing sections 11 and 12, near their front panels, is an automatic overspeed brake assembly 24. At the top of this assembly is a port 26 for entry of the cable 25 along which the hoist is to operate. The top of this cable 25 must be secured to the structure which is to be built or maintained by use of the scaffold. A manual actuator for the brake appears at 151.

A second overspeed brake assembly **24*a* is recommended, though the hoist can be built and used without it. The second brake assembly 24*a* accepts an independent cable 25*a* that is not normally loaded, but serves—with the second brake assembly 24*a*—only as a backup in case the main cable 25 or the first overspeed brake assembly 24** fails.

2. POWER-TRANSMISSION SYSTEM

Figure 2:
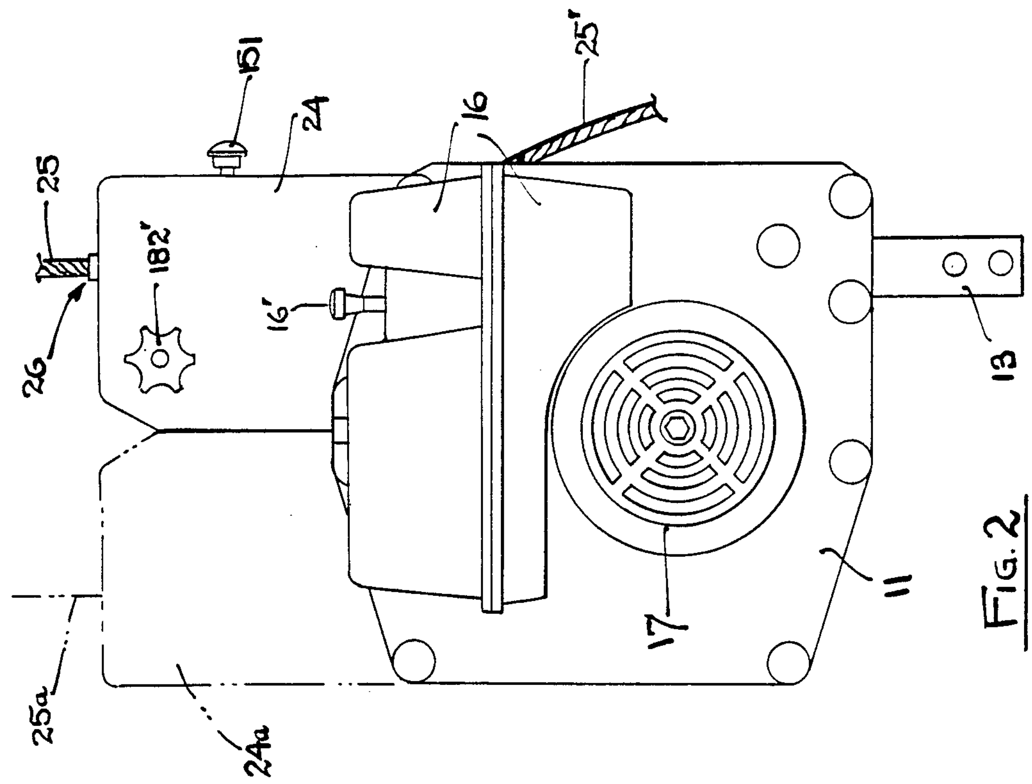
FIG. 2 is an end elevation of the same embodiment.
Figure 3:
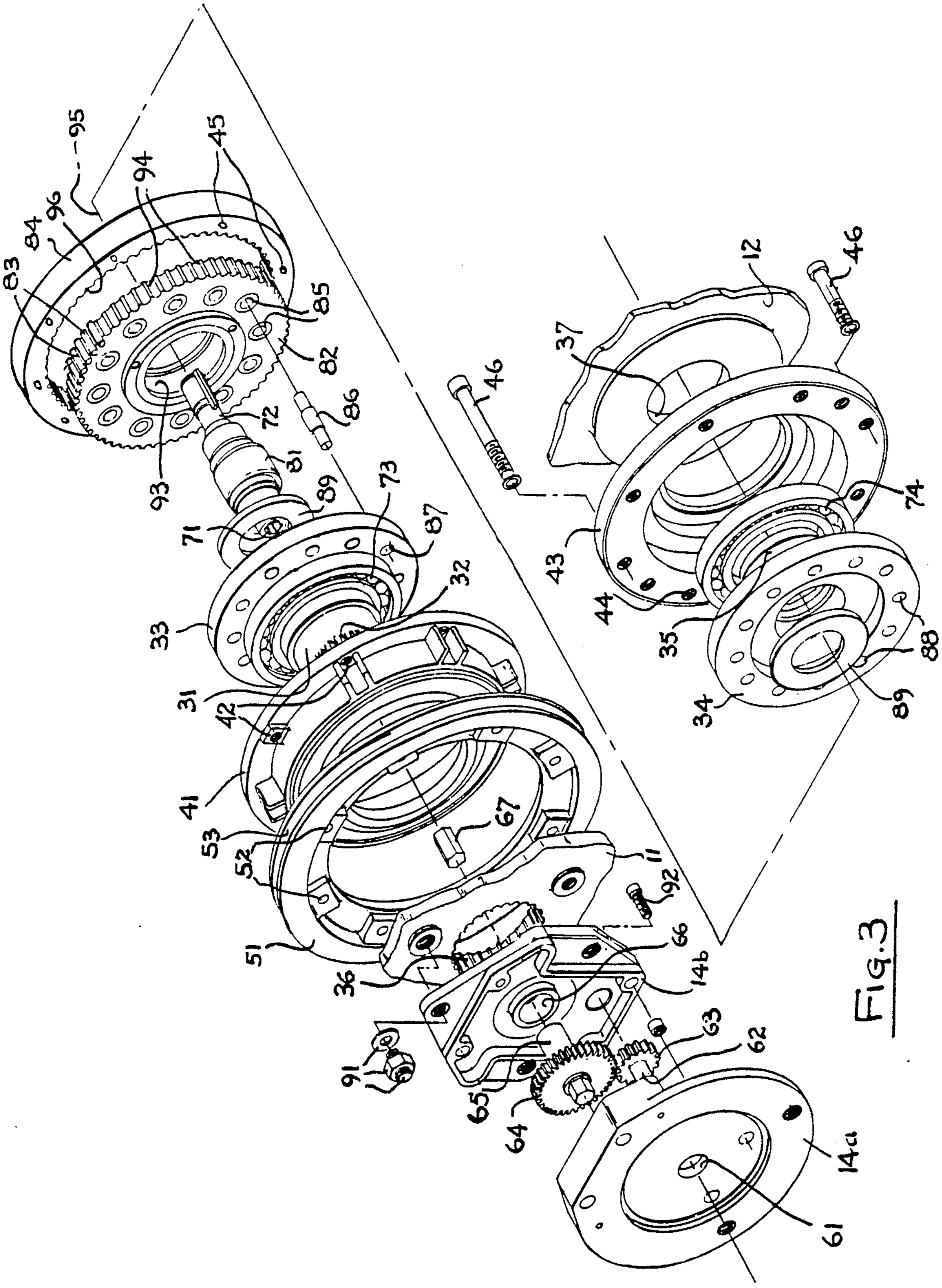
FIG. 3 is an exploded isometric view of the power-transmission system of the embodiment of FIGS. 1 and 2.

FIG. 3 illustrates the power-transmission system (except for the motor 15) of the preferred embodiment of FIGS. 1 and 2.

This description focuses first upon those parts of the power-transmission system that are essentially independent of the type of speed-reducing mechanism used. FIG. 3 shows the leftward and rightward sections 11 and 12 of the hoist housing, just as shown in FIGS. 1 and 2. Formed in these housing sections 11 and 12 are apertures 36 and 37, respectively. These apertures receive the output drive shaft sections 31 and 35, respectively, of the speed-reducing mechanism.

Aperture 36 is internally splined, to mate with the external splines 32 of the corresponding output drive shaft section 31. In this way the output drive shaft section 31 is secured against rotation relative to the hoist housing. As will be seen, the two output drive shaft sections are fixed angularly relative to each other; consequently, holding just one output drive shaft section 31 suffices to prevent both sections 31 and 35 from rotating relative to the housing.

The case of the speed-reducing mechanism is in two half-case sections 41 and 43, with an intermediate section 84. These three parts are fastened to each other and to the sheave 51, as by bolts 46—which pass through the clearance holes 44 in the rightward half-case section 43, the further holes 45 in the intermediate portion 84, and the further holes 42 in the leftward half-case section 41; and thread into the tapped holes 52 in the sheave 51.

In operation, torque from the motor 15 (FIGS. 1 and 2) is applied to the input shaft 71. Due to the operation of the speed-reducing mechanism, corresponding torque is generated between the case 41-84-43 and the output drive shaft sections 31 and 35. Since the output shaft sections 31 and 35, as already explained, are kept from turning relative to the hoist housing 11-12, the case 41-84-43 rotates within the housing 11-12. The sheave 51, being bolted to the speed-reducer case 41-84-43, rotates with that case.

The sheave in turn drives the cable 25 (FIGS. 1 and 2), by means of traction between the cable and the internal walls of a tapered peripheral groove 53 in the sheave, as will be explained in detail below.

The input shaft 71 has an extension 72 which protrudes through the aperture 37 in the rightward housing section 12, into engagement with the primary brake assembly 21 (FIG. 1). The action of the primary brake assembly 21—to hold the hoist at a particular position along the cable—is thus achieved by holding the input-shaft extension 72, and thereby the entire speed-reducing mechanism and the sheave 51.

Figure 3A:
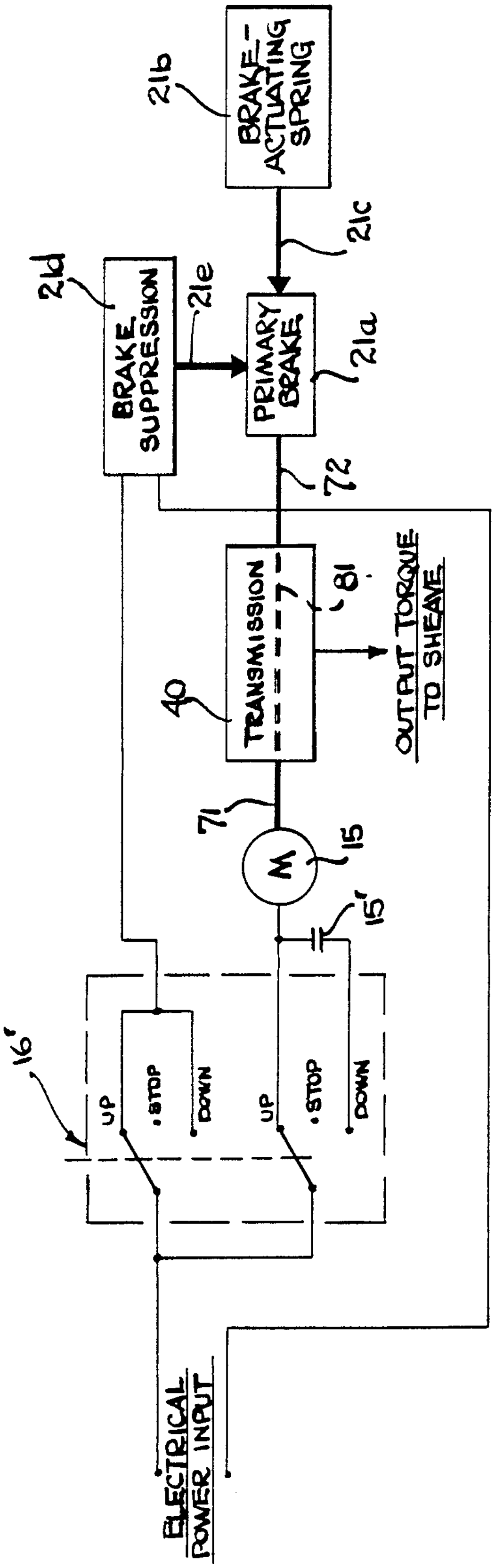

FIG. 3*a* illustrates the general principle of the primary brake 21*a*, which as shown is mechanically connected to the input-shaft extension 72. The motor 15, the input shaft 71, the transmission 40, and the part 81 of the input shaft that is within the transmission 40 are all shown schematically in FIG. 3*a*.

A brake-actuating spring (or "actuating spring means") 21*b* is mechanically linked at 21*c* to the primary brake 21*a*, in such a way that when the electrical power is interrupted the spring 21*b* forcibly applies the brake 21*a* to immobilize the input drive shaft extension 72—and thereby the entire mechanism, including the sheave and cable. This condition obtains when there is no electrical power at the input, or when the switch 16' is set to its "stop" position.

When electrical power is available at the input to the system, and the operator sets the switch 16' to its "up" or "down" position, one pole of the switch 16' transmits the electricity to the motor 15 via its corresponding "up" or "down" terminal (and, in one case or the other, via a phase-reversing capacitor 15'). The motor 15 then delivers torque to the input drive shaft 71. The shaft 71 transmits this torque to the transmission 40, and thereby to the sheave and cable.

It will be noted, however, that there is a second pole of the switch 16', in parallel with the pole which energizes the motor 15. Simultaneously this other pole of the switch 16' transmits electricity to the brake-suppression mechanism (or "powered means for overcoming the spring means") 21*d*, and that mechanism disengages the primary brake 21*a* by means of a mechanical linkage at 21*e*. (As will be clear from FIG. 32, if preferred the brake-suppression mechanism 21*d* may be made to operate upon the brake-actuating spring 21*b* rather than operating upon the primary brake 21*a*.)

This system works to ensure that whenever the motor 15 is not turned on, to power the hoist up or down the cable, the primary brake 21*a* is applied to hold the hoist firmly at its then position along the cable. The system is fail-safe in the sense that proper application of the brake is independent of the availability of electrical power. When the motor 15 is turned on, the brake 21*a* is released.

Depending upon the type of speed-reducing mechanism used, the motor 15 may mount directly to the left side of the leftward housing section 11, or (as illustrated in FIGS. 1 and 3) to a mounting flange 14*a* (FIG. 3) which forms part of a preliminary reducer section 14 (FIG. 1). In either case the input drive shaft 71 (FIG. 3) must be suitably coupled to the motor.

Now when the main speed-reducing mechanism is a quadrant drive, or one of its variants such as a circulute drive, it is desirable to provide a preliminary reducer section such as that shown in FIG. 3: leftward gearbox section 14*a*, rightward gearbox section 14*b*, conventional spur gears 63 and 64, and input and output shafts 62 and 65. The rightward gearbox section 14*b* is fastened—as by stud, nut and washer combinations 91—to the outside of the leftward housing section 11. The two gearbox sections 14*a* and 14*b* are held together as by bolts 92.

The input shaft 62 extends through the leftward gearbox section 14*a*—which as mentioned also serves as mounting flange for the motor 15. The output shaft 65 extends through a bushing 66 formed in the rightward gearbox section, and through the large splined aperture 36 that is formed in the leftward housing section 11.

Connection between the preliminary-reducer output shaft 65 and the main-speed-reducing-mechanism input drive shaft 71 is provided by a hexagonal coupler 67, which rides in mating hexagonal sockets in the respective ends of the two shafts 65 and 71.

The preliminary reducer section compensates for the fact that single-stage quadrant and circulute drives are impractical or at least currently unavailable in reduction ratios exceeding about seventy to one. The preliminary reducer also permits customizing the apparatus to particular applications by selection of the reducing spur gears as a pair—to maintain the necessary spacing between the input and output shafts 62 and 65, while varying the tooth ratio on the spur gears 63 and 64.

Nominally, spur gears 63 and 64 are selected to provide a two-to-one reduction, and the main reducing mechanism provides a sixty-to-one reduction, for an overall ratio of 120 to one.

As to the quadrant or circulute drive itself, the input shaft 71 is made integral with an eccentric shaft 81. This eccentric shaft acts through rollers (not shown) against the internal circular-cylindrical surface of a roller-bearing race 93. This race 93 forms the central hub of a sprocket wheel 82 that has peripheral teeth 94. By virtue of riding on the eccentric shaft 81, the sprocket 82 revolves around the centerline 95 of the mechanism.

The intermediate casing portion 84 mentioned earlier is actually a functional part of the speed-reducing mechanism—a capture gear, having internal teeth 96 for receiving and holding a multiplicity of drive pins 83. Since the capture gear is bolted to the casing sections 41 and 43, the drive pins 83 are fixed relative to the casing 41-84-43 of the quadrant drive. As the sprocket 82 revolves about the mechanism centerline 95, its external teeth 94 engage whichever of the drive pins 83 are held in the internal teeth 96 of the capture gear 84 at an angle corresponding to the revolution angle of the sprocket 82.

For example, when the sprocket 82 is directly above the centerline 95, its upper teeth engage those drive pins that are held in the capture gear teeth directly above the centerline 95—and a certain number of drive pins to both sides of that position, approaching as many as one-third to one-half of all the pins, for favorable designs. (As previously mentioned, this multiple engagement spreads the torque over many more teeth of the sprocket and capture gear than the two or three teeth that bear the load in conventional gearing systems.) When the sprocket 82 is *below* the centerline 95, its teeth 94 engage those drive pins 83 that are held in the teeth 96 of the capture gear 84 below the centerline, and so forth.

By virtue of this engagement between the sprocket 82 and (via the drive pins 83) the case-integral capture gear 96, the sprocket 82 is prevented from spinning freely on the eccentric shaft 81. The sprocket 82 in fact is constrained to rotate systematically relative to the capture gear 84—by exactly as many tooth spacings per revolution of the eccentric shaft 81 as the *difference* between the number of teeth 94 on the sprocket 82 and the number of teeth 96 inside the capture gear 84.

The speed-reduction ratio of the mechanism is equal to this difference (a measure of the change in angular position of the sprocket 82 per rotation of the eccentric shaft) divided by the total number of teeth on the sprocket 82 (a measure, in compatible units, of the change in angular position *of the eccentric shaft* 81 per rotation of the eccentric shaft).

For example, if there are sixty teeth 94 on the sprocket 82 and sixty-one teeth 96 on the capture gear 84, the difference is thus made equal to one, and the quotient is one divided by sixty: the angular velocity of the output drive shafts 31 and 35 is one-sixtieth the angular velocity of the input drive shaft 71, and the mechanical advantage is sixty to one. These principles of operation of the quadrant drive may be further understood from the earlier-mentioned patent to Kennington and Dimitracopoulos.

In the particular embodiment illustrated in FIG. 3, the rotation of the sprocket 82 is transmitted to the output drive shafts 31 and 35 by means of twelve "axle" pins 86. These pins 86 ride within the bushings 85 in the sprocket 82 and extend into the holes 87 and 88 in "torque reactors" 33 and 34, respectively, at the two sides (axially) of the sprocket 82. The holes 87 and 88, and the ends of the axle pins 86, are mutually sized to accommodate the eccentric motion of the sprocket while maintaining driving engagement between the axle pins 86 and the interior surfaces of the holes 87 and 88.

In this way the rotational motion of the sprocket is transmitted to the torque reactors 33 and 34, and these elements are respectively integral with the output drive shafts 31 and 35. Consequently the sprocket motion is transmitted to the output drive shafts 31 and 35. The output drive shafts 31 and 35 ride within large ball bearings 73, which are fitted into recesses in the casing sections 41 and 43 respectively.

To reduce vibration, two counterweights 89 are fixed to the input shaft 71 and its extension 72, respectively, at the two sides (axially) of tne eccentric shaft 81—which is to say, one on each side (axially) of the sprocket 82. These two very compact counterweights 89 are weighted and angularly positioned to counterbalance the eccentric motion of the sprocket 85 and axle pins 86.

3. TRACTION SYSTEM

Figure 4:
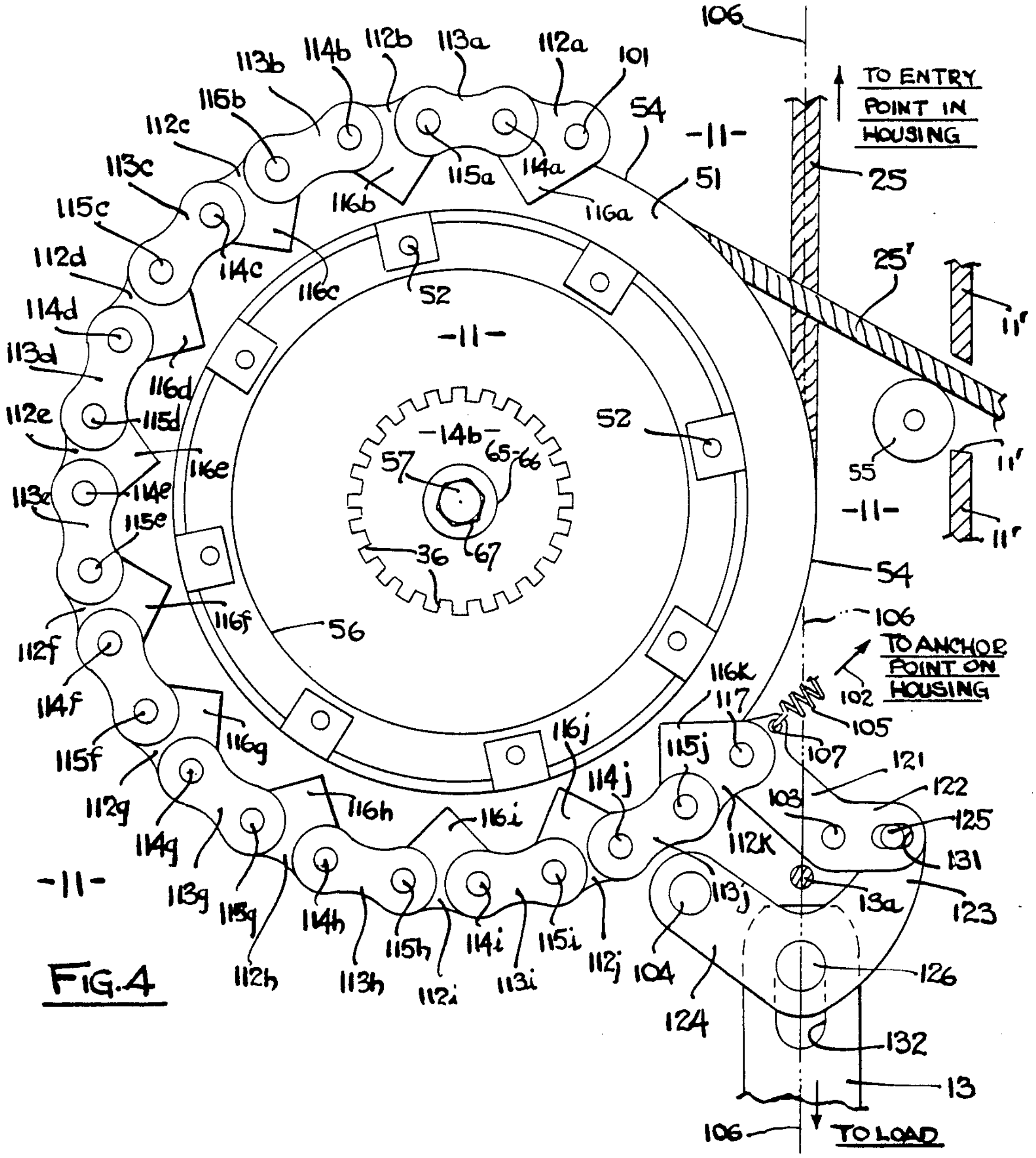
FIG. 4 is an elevation showing the traction system of the embodiment of FIGS. 1 and 2.

FIGS. 4 through 8 illustrate the traction system used in the preferred embodiment of FIGS. 1 and 2. In particular FIG. 4 is an elevation looking toward the inside wall of the leftward housing section 11, from the right (as shown in FIG. 1). Prominent in this drawing is the sheave 51, with its peripheral surface 54, tapped mounting holes 52, and inner circular hole 56. The inside wall 11 is visible at the periphery of the drawing, and also at the center of the drawing by virtue of the central hole 56 in the sheave 51.

In this inside wall 11 there appears—through the hole 56 in the sheave—the internally splined aperture 36 that was discussed above in relation to FIG. 3. Through this aperture, in turn, may be seen the outside wall of the gearbox section **14*b*, the preliminary-reducer output shaft 65 (running in bushing 66 in the gearbox section 14*b*), and the hexagonal coupler 67 received in a hexagonal socket in the end of the output shaft 65—all of which were also shown in FIG. 3** and discussed in relation to that drawing.

Entering from above right in the illustration is a cable 25 (shown also in FIGS. 1 and 2), following a plumb line 106 that is generally tangent to the sheave periphery 54, though slightly inward radially from the extreme periphery. This cable follows a path around roughly three-quarters of the sheave circumference, to a point just below a post 101 that is fixed in the inside wall 11.

In a very general way the cable continues as toward 25' to follow the sheave periphery 54. As will be understood shortly, however, in the area 25' to the right of the post 101 the cable is neither under tension nor pressed against the sheave, whereas it is tensioned in the first 270 degrees (roughly) of its path around the sheave, and it is pressed against the sheave in the last 225 degrees (roughly) of those 270 degrees.

Figure 5:
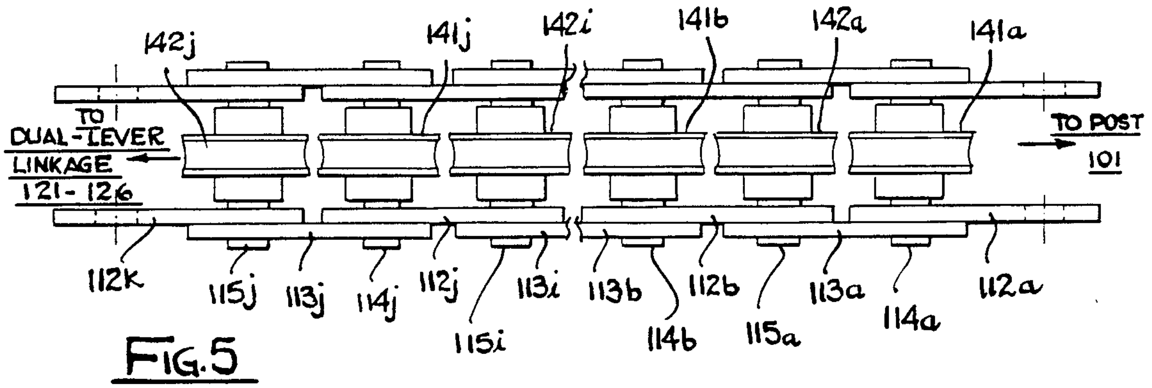
FIG. 5 is a plan view of the chain-like member used in the FIG. 4 traction system, but here shown extended. (To preserve a reasonable drawing scale, only the three rollers at each end of the chain-like member, along with their associated side bars, are illustrated; the intermediate rollers and side bars are omitted.)

Pivotally secured to the post 101 is one end of a chain-like member **112*a* through 112*k*, also shown in FIG. 5, which wraps around the sheave 51. This chain-like member is made up of two kinds of side bars—on each side eleven inside bars 112*a*, 112*b*, . . . 112*j* and 112*k*, and ten outside bars 113*a*, 113*b*, . . . 113*i* and 113*j* —and twenty rollers 141*a* through 142*j* (see FIG. 5), with corresponding bushings 114*a* through 115*j*. The bushings 114*a* through 115*j*** act as pins to hold the side bars together in the sequence illustrated.

The rollers **141*a*, 141*b*, . . . 141*i*, 141*j*, and 142*a*, 142*b*, . . . 142*i*, 142*j* all act to press the cable 25-25' into the peripheral groove 53 (FIGS. 3, 6, 7 and 8) of the sheave. By friction between the groove wall 53** and the sides of the cable, the sheave obtains traction on the cable.

As seen in FIG. 5, the first traction roller **141*a* rides on a bushing 114*a*; as seen from FIG. 4, this bushing is above and just to the right of the center 57** of the sheave. The *last* traction roller **142*j* (FIG. 5) rides on a bushing 115*j*, which is (FIG. 4) approximately halfway along the circumference of the sheave between the tangent point to the plumb line 106** and the lowermost point of the sheave. Thus the traction rollers extend around roughly five-eighths of the circumference of the sheave, or approximately 225 degrees, as previously mentioned.

These figures represent almost the same "wrap" angle obtained through the use of the auxiliary sheave introduced by Evans, but with a far simpler mechanism. The mechanism is in fact only slightly more elaborate than that of the basic Naito patent, but wraps traction rollers around fifty percent more of the sheave circumference than the Naito design.

The same benefits may be seen even more clearly in terms of the number of rollers. The present invention provides twenty such rollers, which is the same as the Evans device and twice as many as the Naito device.

The key to these advantages resides in the specific geometry of the linkage 121-122-123-124-13, which applies the weight of the load to tension the chain-like member **112*a*–112*k*. To tension this chain-like member it is necessary to pull the final link 112*k* rightward (as drawn in FIG. 4); however, to keep the entire mechanism from canting into an unfavorable orientation it is also necessary to align the hook or stirrup 13 (FIGS. 1, 2 and 4) along the plumb line 106** directly below the cable entry point. These two constraints tend to be in conflict.

Prior devices following the Naito design have let the second of these constraints control—meaning that the final link in the chain-like member has been placed well to the left of the plumb line, to leave enough room for a lever arm between the final link and the plumb line. The Evans principle resolved this conflict by deflecting the cable substantially and in a relatively elaborate way, and by providing a relatively elaborate mechanism.

The present invention accommodates both constraints with a relatively simple mechanism—by using a dual-lever linkage to, in effect, fold the motion over upon itself so that the final link **112*k* itself can extend almost to the plumb line 106. The first lever in the linkage is 121-122; this lever is pivoted about a post 103 that is secured in the housing wall 11. One arm 121 of this first lever is connected by a pin 117 to the final link 112*k*; another arm 122, at the other end of the lever, is connected by another pin 125 to the second lever 123-124**.

The second lever 123-124 is pivoted about a post 104 that is secured in the housing wall 11. The full length of the second lever 123-124 is used as one lever arm, between the fulcrum post 104 and the pin 125 that connects the two levers together; and the partial length 124 serves as another lever arm, between the fulcrum post 104 and another pin 126, which supports the scaffold stirrup 13.

The interlever linking pin 125 is journalled in the end of one lever arm 123 of the second lever 123-124, but rides in an *elongate slot* 131 in the arm 122 of the first lever 121-122. The use of a slot 131 rather than a circular hole accommodates the need for a *variable* effective lever arm 122—that is, an arm of length that is different for different positions of the lever arms. Different positions of the lever arms result from (1) the use of different cable diameters, as will be seen from the following discussion, and from (2) different scaffold loads, and hence different amounts of tension on the chain-like member.

The stirrup 13 similarly is provided with an elongate slot 132 for the linking pin 126 to the second lever, to allow for some forcible upward motion of the scaffold without drastic loss of tension and traction at the cable.

To hold the chain-like member nominally in position when there is no weight on the stirrup 13, the final link **112*k* is lightly tensioned in the direction indicated by the arrow 102 in the drawing; this tension is applied by a spring 105**, with an anchor point (not shown) on the housing.

Also retaining the chain-like member in position under various unstable conditions—as, for instance, when the cable is snapped or whipped by externally generated forces, or when the scaffold falls abruptly, actuating the overspeed brake—are radially inward extensions **116*a* through 116*k* of the corresponding inner links 112*a* through 112*k*. These radially inward extensions 116*a* through 116*k*, extending toward the center 57** of the sheave, ride rather closely at the sides (axially) of the sheave.

They make it very unlikely that high accelerations of the equipment—or even breaking or "birdcaging" of the cable—will disrupt the engagement of the chain-like member with the sheave, or will lead to escape of the cable from the cable path formed between the sheave and the chain-like member. This feature is particularly important when the equipment is used with large-diameter cables, which, as will be seen, tend to ride very high in the groove 53 of the sheave and thus to place the innermost surfaces of the traction rollers **141*a*, etc., well outside the groove 53** of the sheave.

To prevent the loose segment 25′ of the cable from chafing against the tensioned vertical segment 25 of the cable, the loose segment 25′ is passed over a guide 55—forward of the tensioned segment 25—to an exit aperture 11″ in the rear wall 11′ of the leftward housing section 11.

Figure 8:
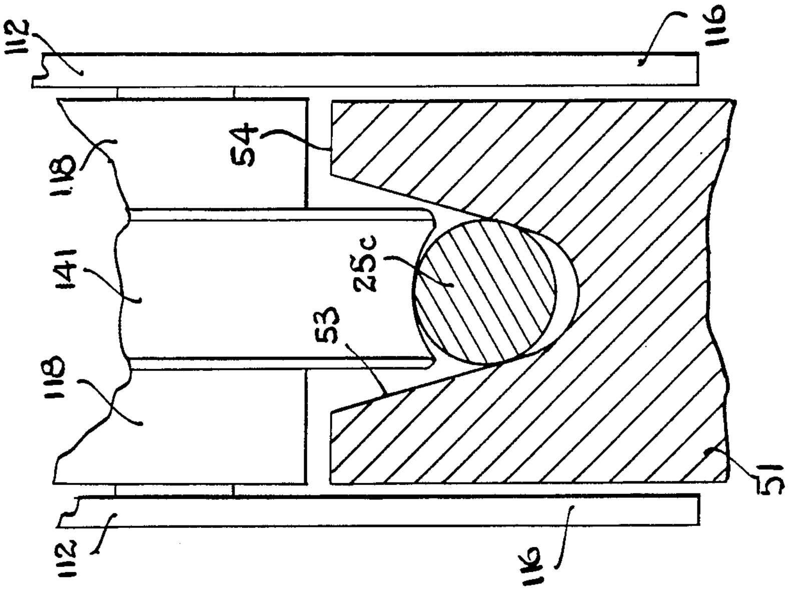
FIGS. 6 through 8 are elevations, partly in section, showing the detailed engagement of the traction system of FIG. 4 with cables of three different sizes, respectively.
Figure 7:
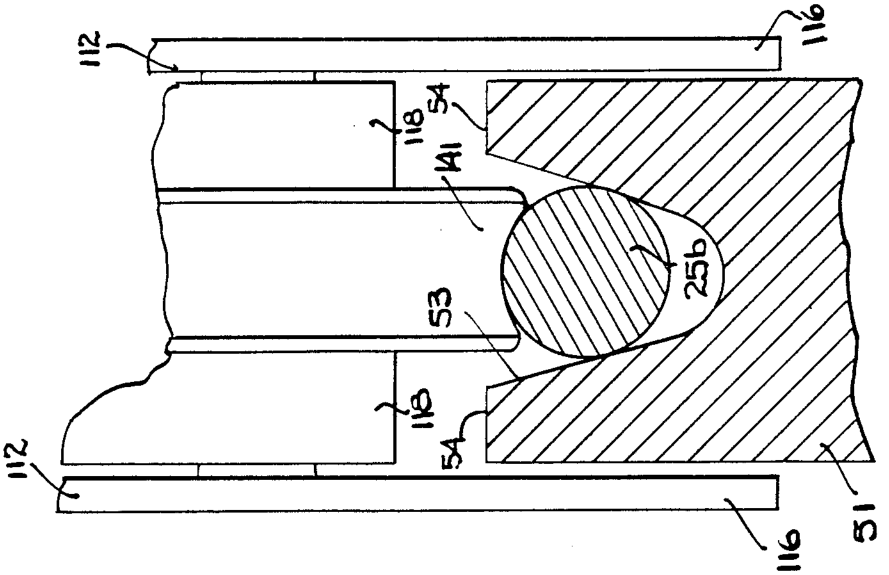
Figure 6:
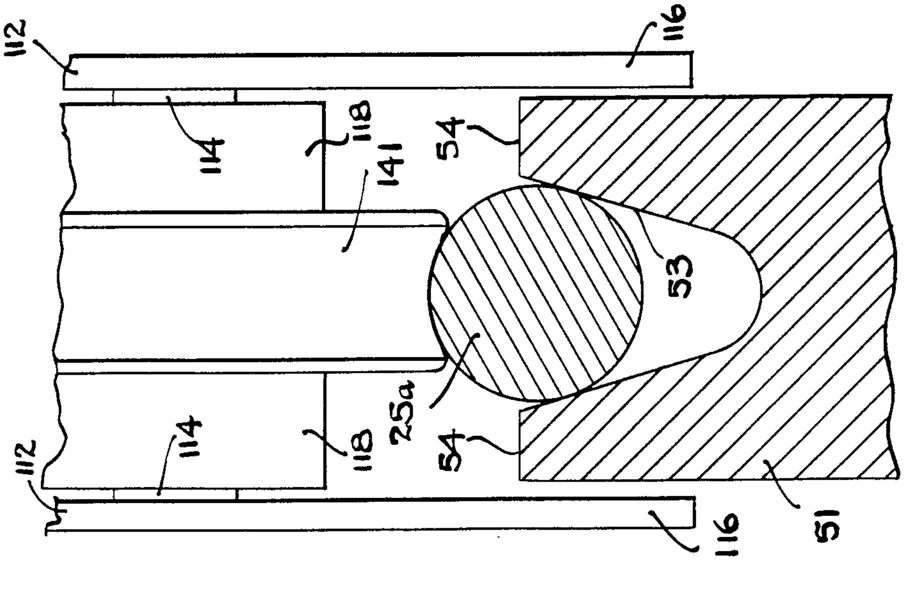

FIGS. 6 through 8 illustrate the way in which the traction system of the present invention accommodates cables of different diameters. The sheave 51 appears in section at the bottom of each of the three drawings, and a typical traction roller 141—with ends 118 turned down to a smaller diameter—appears at the top. The bushing 114 is shown in each drawing, extending through the center of the roller 141 and into the inner side bar 112. The radially inward extensions 116 of the inner side bar 112 are also shown. (The outer side bar 113 and the rivet-like enlargement of the bushing 114 on the outside of the outer side bar 113, however, are omitted.)

FIG. 6 illustrates these components in use with a cable **25*a* of the largest diameter which the device can accommodate. The cable cross-section is literally wedged into the groove. In other words, by the principle of the inclined plane, the tension in the chain-like member is multiplied by a mechanical advantage related to the taper angle of the groove 53, to produce extremely high pressure between the cable and the groove (when the tension on the chain-like member is high). The cable is flattened slightly at areas of contact with the tapered groove 53**—one such contact area at each side of the sheave's central plane. The result is extremely effective traction.

These contact areas extend very nearly to the periphery 54 of the groove—but not quite. If the cable were to touch the "corner" between the groove 53 and the peripheral surface 54, the resulting truncation of the contact area would cause at least partial loss of traction. Moreover, the resulting abrupt pressure discontinuity would generate damaging stresses within the cable. The traction roller 141 is entirely outside the groove, but as mentioned above the skirts or radially inward extensions 116 of the side bar 116 ride along the two sides (axially) of the sheave 51, keeping the chain-like member in place and preventing escape of the cable **25*a*** even in event of relatively violent mechanical disruptions.

FIG. 7 illustrates the same components in use with a cable **25*b* of diameter generally central to the range of diameters that is of interest. The cable is here well within, and the traction roller 141 slightly within, the groove 53. By virtue of being turned down to smaller diameter than the roller 141 cable-contact surface, however, the end portions 118 of the roller are well separated outwardly (radially) from the sheave periphery 54**.

FIG. 8 illustrates the same components in use with a cable 25c of the smallest diameter for which the equipment is intended. Here the cable approaches the bottom of the groove—but it is crucial that it not actually bottom out, since the "wedging" deformation of the cable described above, and necessary to produce the high tractive force mentioned above, would then be absent.

It would not suffice to merely press the cable into the bottom of the groove, with the available tension of the chain-like member but without the mechanical advantage provided by the wedging action along the tapered sides of the groove. In short, if the cable were allowed to bottom out, the proportionality between scaffold load and tractive force would be defeated—and traction would likely fail, and the cable would slip in the sheave.

The turned-down ends 118 of the roller here come quite close to the periphery 54 of the sheave, but do not touch. This too is crucial, since if the roller ends 118 did touch the outer surface 54 of the sheave the force available to wedge the cable 25c into the groove 53 would drop very sharply. Again, the load/traction proportionality would be destroyed, traction would likely fail, and the cable would slide through the mechanism.

The two-diameter roller geometry described here is an important part of the solution which the present invention provides to the conflicting requirements posed by multiple cable diameters. Such multiple requirements necessitate providing a sheave groove that is wide at the top (for large-diameter cables), narrow at the bottom (for small-diameter cables), and deep (to obtain both width regions in a single groove)—and into which the engaging part of the roller must penetrate, to reach the small-diameter cables near the bottom of the groove.

As previously mentioned, the three cable diameters represented by FIGS. 6 through 8 are eight, nine and ten millimeters respectively—the first and last of these sizes corresponding closely to five-sixteenths and three-eighths of an inch. The sheave groove found to be effective in this context is 0.45 inch deep, with a radius of 0.10 inch at the bottom and the opposing groove walls at thirty degrees to one another (i.e., the half-angle is fifteen degrees).

At the extreme periphery of the sheave the groove is 0.424 inch wide. The overall width of the sheave is 0.709 inch—a dimension that has some importance, since it has been found to provide satisfactory side-wall thickness (0.14 inch at the periphery) and therefore strength to withstand the wedging forces discussed above.

Earlier sheaves, used for nine-millimeter cables in devices of the Evans-Hippach type, had overall width of only about 0.65 inch, and had grooves 0.15 inch shallower, or only about 0.30 inch deep.

4. OVERSPEED BRAKE SYSTEM

This part of the invention is illustrated in FIGS. 9 through 12. The front cover 22, side covers 23 and 24, entry port 26, and manual brake actuator 151 shown in FIGS. 1 and 2 all appear in FIGS. 9 through 11 as well.

The operating components of the overspeed brake assembly are mounted to a generally planar vertical wall or frame, which is disposed roughly midway between the left and right covers 24 and 23. The components on the left side of the wall (FIGS. 10 through 12) are those which directly engage the cable—some to sense the cable velocity, and others to brake or jam the cable.

The components on the right side of the wall (FIG. 9) are those whose functions are intermediate to the sensing and braking functions—namely, testing of the sensed velocity against a calibrated standard, and automatic application of the brake if the velocity fails the test (that is, if the testing indicates that the velocity is excessive).

Figure 11:
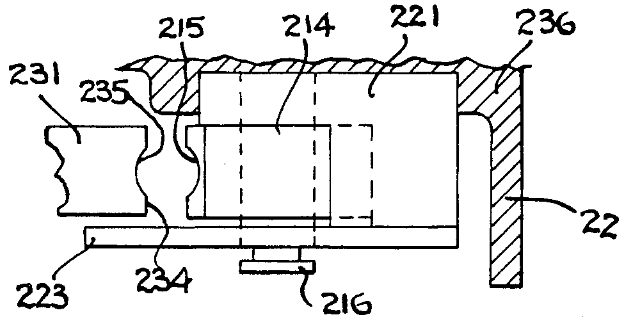
FIG. 11 is a detailed view of part of the overspeed braking system, taken along the line 11—11 in FIG. 10, looking down.
Figure 10:
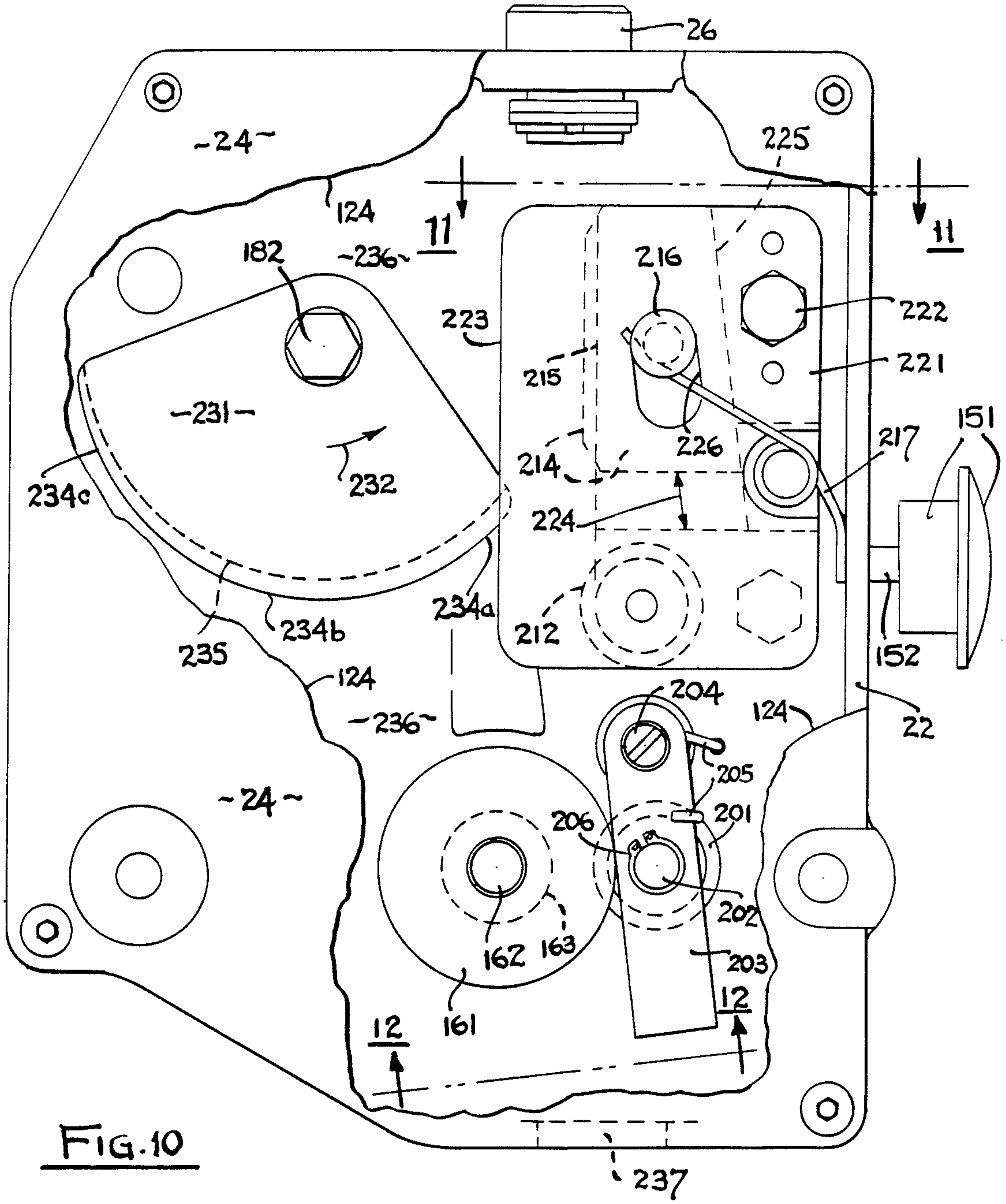
Figure 12:
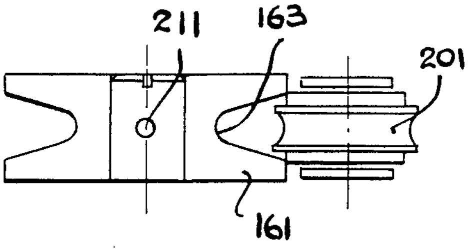
FIG. 12 is another detailed view of part of the overspeed braking system, taken along the line 12—12 in FIG. 10, looking up (at a slight angle to the vertical).

The cable enters the automatic overspeed brake assembly through an entry bushing 26 (FIG. 10), and passes just out of grazing contact with the backup block 214 (FIGS. 10 and 11). In particular the cable passes just out of grazing contact with the bottom of the groove 215 at the rear (to the left in FIG. 10) of the backup block 214. The cable then passes into engagement with the idler wheel 212, which is rotationally mounted to the wall 236 and which helps hold the cable in proper alignment, just barely out of grazing contact with the bottom of the groove 215.

Next the cable engages the speed-sensing wheel 161, entering its groove 163. This wheel 161 too is mounted for rotation in the wall 236, by means of a bolt 162 which rides in a bushing formed in or fitted into the wall. The wheel 161 is pinned as at 211 to the bolt 162, so that the wheel and bolt must rotate together. The cable exits through the lower port 237, to enter the traction mechanism at 25 (FIG. 4).

The relative alignment of the entry port 26, idler 212, speed-sensing wheel 161, lower port 237, and sheave periphery 54 (FIG. 4) is such that the cable must deflect slightly forward (to the right in FIG. 10) to pass the speed-sensing wheel 161. By means of this geometry a fraction of the weight of the scaffold is applied to press the cable toward (but not to) the bottom 163 of the groove in the speed-sensing wheel 161. The traction principles here are very generally similar to those described in connection with the drive sheave. As will be seen, however, there is very little resistance to rotation of the speed-sensing wheel 161; consequently, while the traction here must be positive, it need not be very high.

Juxtaposed to the speed-sensing wheel 161 is a guide wheel 201. The purpose of this wheel 201 is to aid in guiding the cable into engagement with the speed-sensing wheel 161 and through the lower port 237 when there is no load on the hoist—and to aid in retaining the cable in engagement with the speed-sensing wheel 161 under that condition. The guide wheel is mounted, by a pin 202 and circlip 206, for rotation to an arm 203—which arm is in turn mounted by a bolt 204 for rotation relative to the wall 236. The arm is biased by a spring 205 to swing the guide wheel 201 toward the speed-sensing wheel 161.

Figure 9:
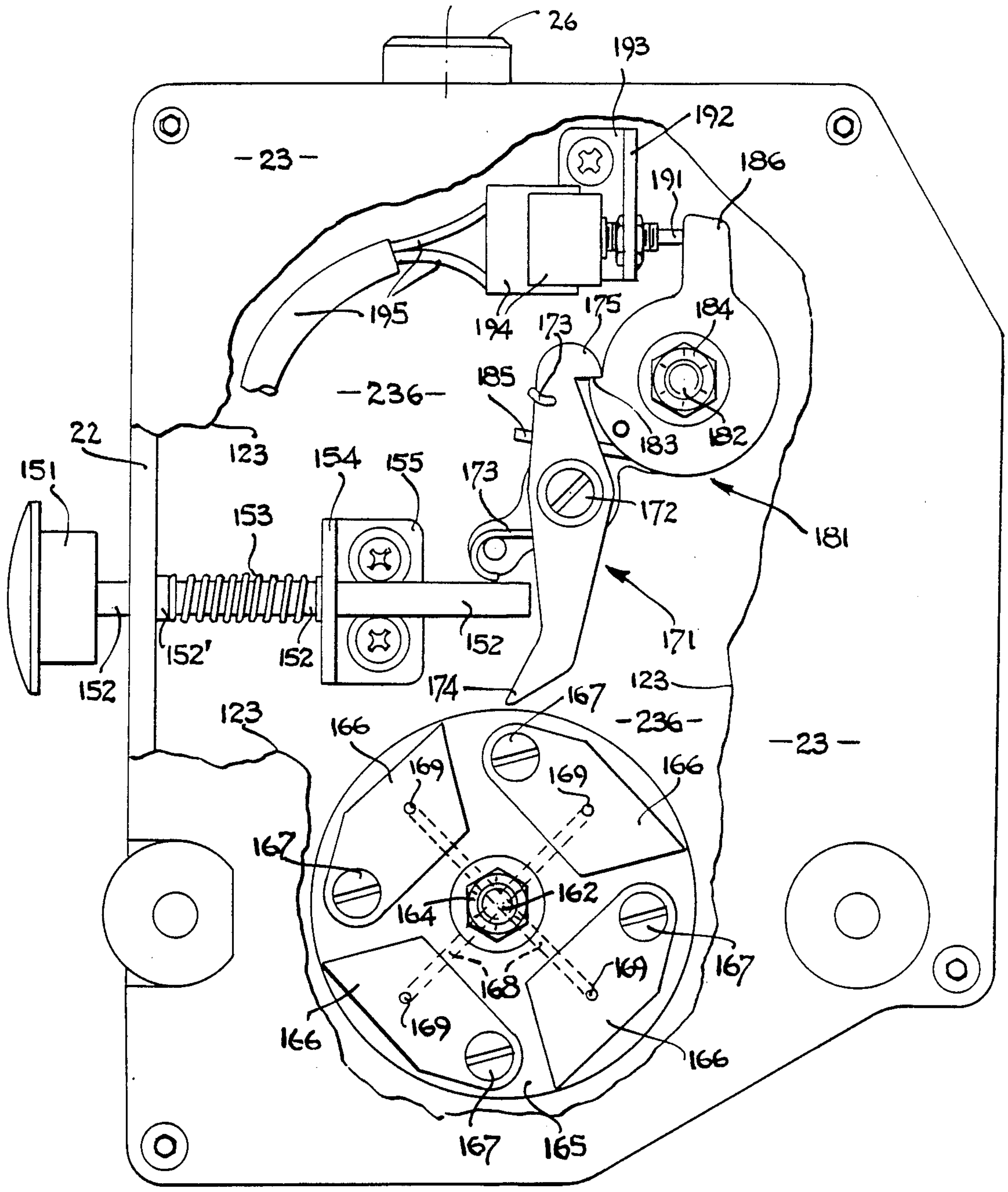
FIG. 9 is an elevation, partly broken away, showing an overspeed braking system used in the embodiment of FIGS. 1 and 2, from the right side (as viewed in FIG. 1).

When a cable is in place in the mechanism, whatever longitudinal motion it may have is transmitted to the speed-sensing wheel 161 and thereby to the bolt 162. Also pinned or keyed to this same bolt 162, but at the other side of the wall 236, is a turntable 165 (FIG. 9). Mounted to this turntable are four weights 166, each pivoted to the turntable at a respective bolt axis 167. The four weights 166 are arranged symmetrically about the center of the turntable 165, and the opposed pairs of weights are interconnected by calibrated springs 168.

When a cable in the mechanism rotates the speed-sensing wheel 161, bolt 162 and turntable 165, centrifugal force tends to move the weights 166 outward from the center of the turntable. This tendency is opposed by the springs 168, so that the positions of the weights relative to the center of the turntable depend upon the ratio of cable speed to the spring constants of the springs 168. The spring constants are chosen so that in an overspeed condition will the weights swing outward far enough to reach the tip 174 of a trigger 171 (FIG. 9), just above the turntable 165.

The trigger 171 is mounted to the wall 236 for rotation about pivot bolt 172, and is biased in a clockwise direction by a spring 173. While the lower end of the trigger 171 terminates in the tip 174, just mentioned, the upper end 175 is formed into a hook or ratchet arm for engagement with a mating ledge or hook 183 formed in a brake actuator 181. The actuator 181 is a generally disc-shaped member, mounted for rotation relative to the wall 236 by means of a bolt 182 which rides in a bushing in the wall 236, and a nut 184 that holds the actuator 181 in place axially. The actuator 181 is keyed or pinned to the bolt 182, and like the trigger 171 is biased in a clockwise direction by a heavy spring 185.

If the cable is moving upward relative to the apparatus—a condition corresponding to descent of the apparatus along the cable—the speed-sensing wheel 161 rotates counterclockwise (as seen in FIG. 10), driving the turntable clockwise (as seen in FIG. 9). When the turntable is operating in this direction and the weights swing outward far enough to reach the tip 174 of the trigger 171, the weights force the tip 174 rightward (in FIG. 9), tending to rotate the trigger 171 counterclockwise against its spring 173, and against the frictional force between the trigger hook 175 and the actuator-disc hook 183.

Once the weights engage the trigger tip 174, the full weight of the hoist load is applied—through the traction of the cable against the speed-sensing wheel 161—to overcome the effects of the spring 173 and the friction between the hooks 175 and 183. All of this chain of events takes only a small fraction of a second. In response the trigger immediately snaps counterclockwise, releasing the actuator disc 181. The latter also immediately rotates, but clockwise, under the influence of its driving spring 185, to apply the brake.

Thus the mechanism as shown in FIGS. 9 and 10 is in a "cocked" condition.

In addition to applying the brake (as will be described in detail below), the actuator disc 181 acts through an arm 186 to release the control button 191 of a switch 194, which is mounted by an "L" bracket 192-193 to the wall 236. The bracket consists of one portion 193 that is screwed flat against the wall 236, and another portion 192 that stands out at right angles to the wall 236. The switch 194 is mounted to the latter portion 192.

The switch 194 is normally open, but when the mechanism is cocked as illustrated the arm 186 of the actuator 181 depresses the switch control button 191, supplying a switch closure to the control electronics in the electronics compartment 16 (FIGS. 1 and 2). This switch closure signifies that the overspeed brake is not applied. When the trigger 171 snaps counterclockwise and the actuator disc 181 clockwise, the switch button 191 is released and the switch opens, signifying that the overspeed brake is applied. The electronics include a relay or like logic circuit that locks out operation of the motor 15 when the switch closure is absent—to avoid operating the motor against the brake.

In the event that an operator of the hoist wishes to apply the brake when there is no overspeed condition, the operator may do so by pressing the manual actuator button 151. The actuator button 151 is secured to a shaft 152 (FIG. 9), which passes through a bushing in the front wall 22 of the brake assembly and through one leg 154 of an "L" bracket 154-155 (similar to the bracket 192-193 described earlier).

Fixed to the shaft 152 is a stop ring 152', which prevents the shaft from escaping through the front wall 22. The stop ring 152' also serves as an anchor point for a spring 153 that surrounds the shaft between the inside of the front wall 22 and the bracket leg 154. This spring biases the shaft forwardly—so that the actuator button 151 moves away from the front wall 22, toward the operator, and so that the inward end of the shaft clears the trigger 171.

When the operator presses the actuator button 151, the button moves the shaft 152 inwardly against the action of the spring 153 and into engagement with the trigger, forcing the trigger counterclockwise. The result is to release the actuator disc 181, as previously described, and thereby to apply the brake.

When the actuator disc 181 operates clockwise (as seen in FIG. 9), it rotates the bolt 182. This bolt extends through the wall 236 to the left side of the apparatus (FIG. 10), where it is pinned to a cam 231. The cam thus rotates counterclockwise (as seen in FIG. 10), as indicated by the arrow 232, into engagement with the cable. A backup block 214 (FIGS. 10 and 11) is provided to avoid the cable's simply retreating from the cam. The cam 231 and backup block 214 both are grooved—at 235 and 215 respectively—to avoid the cable's escaping sideward (that is, axially) off the side of the cam.

The cam 231 is of variable radius, being tapered gradually from a relatively small radius in the region **234*a* closest to the cable, through an intermediate radius in the region 234*b* that is centrally located along the cam surface, to a relatively large radius in the region 234*c*** that is furthest from the cable.

This gradual increase of radius serves a dual function:

First, when the cam swings into engagement with the cable, the cable is very nearly tangential to the cam and just grazes the cam; the cam surface is angled at an extremely shallow angle relative to the cable. Thus the spring 185 (FIG. 9) is acting through a very large mechanical advantage, provided by the inclined-plane principle, to advance the cam against whatever resisting force may be present. At least in the case of manual actuation of the brake when the scaffold is stationary, the force of friction between cam and cable provides such a resisting force.

If the cable is moving upwardly (that is, in the same direction as the cam surface), then once the cam has moved into frictional engagement with the cable, the cable helps to pull the cam further along its rotary path, and thus further into frictional engagement. Eventually the cam swings so far toward the backup block, squeezing the cable between cam and block, that friction overcomes the momentum of the apparatus and stops the cable. This generally occurs within about two inches of cable travel.

(Once the cam has jammed or pinched the cable in this way, the pinched portion of the cable should not be relied upon. The cable must be repaired, if possible, or preferably discarded.)

As to the second function of the tapered cam surface, by use of a taper that extends far enough it is possible to provide a first region **234*a* along the cam surface for engagement with large-diameter cables such as 25*a* in FIG. 6, a second region 234*b* for engagement with intermediate-diameter cables such as 25*b* in FIG. 7, and a third region 234*c* for engagement with small-diameter cables such as 25*c* in FIG. 8**.

The mechanism is thus rendered essentially indifferent, within the design limits, to the diameter of the cable in use. The only difference is in the time required for the cam to swing far enough for the pertinent segment of the cam surface to engage the cable, and this difference is made insignificant by proper choice of the cam driving spring 185.

After the overspeed brake has gone into operation, and after the scaffold and hoist have been secured and the traction (or other) failure which occasioned actuation of the brake has been corrected, it is desirable to release the jammed cable from the brake mechanism. Because of the very high forces that operate in jamming the cabling against the backup block 214, resetting the mechanism would expectably require comparable forces. Normally however, wrenches or other tools with very long lever arms are not available under field operating conditions. As a part of the present invention it has been recognized that some provision is highly desirable for resetting the mechanism with only moderate force.

This provision in the present invention is made by mounting the backup block 214 for sliding motion along the angled path 225 formed by the interface between the backup block 215 and a fixed block 221. This sliding motion—along the line of motion indicated by arrows 224 (FIG. 10) —is also guided by an angled slot 226, which is formed in a cover plate 223 (FIGS. 10 and 11). Both the interface path 225 and the slot 226 are angled in such a way that (1) the backup block 214 is closest to the cam 231 when the block is at the top of its sliding motion, and (2) the block 214 is furthest from the cam 231 when the block is at the bottom of its sliding motion.

The slot 226 is engaged by a guide pin 216, which passes through the backup clock 214 into the stationary block 236 behind the backup lock 214, and which also extends outward through the slot 226. The backup block is biased upward by a spring 217 which operates against the guide pin 216. Hence, when the apparatus is in its cocked condition as illustrated, the block 214 is spring-loaded upward, with its guide pin 216 pressed against the top end of the slot 226, and the block is thus in its position that is closest to the cam 231. When the brake is applied, the block 214 tends to be pulled upward by the cam, so that the guide pin 216 is pulled harder against the top end of the slot 226; thus the block remains in its position that is closest to the cam, and there is no decrease in efficacy of the jamming action of the cam against the cable.

When the cable is no longer under load and it is time to release the brake, however, this normally can be accomplished by means of the handle 182' (FIGS. 1 and 2), which extends through the wall 24 of the brake housing to engage the hexagontal head of the bolt 182 (FIG. 10).

If the cable has been jammed with unusually great force, the leverage provided by the handle 182' may be insufficient to release the brake. In such cases the brake can be released with the aid of an ordinary wrench applied to the hexagonal head of the bolt 182 (FIG. 10)—possibly using a relatively modest lever arm to aid the wrench. The bolt 182 and cam 231 are rotated clockwise (counter to the direction indicated by the arrow 232), tending to slide the backup block 215 downward against the action of the spring 217. As the backup block 215 moves downward it retreats from the cam, by virtue of the angled interface 225, slot 226, and thus motional path 224. This retreating action immediately and significantly decreases the normal force between the cam, cable and block, and in turn decreases the associated frictional force, so that the cable can be easily disengaged.

5. CONCLUSION

It is to be understood that all of the foregoing detailed descriptions are by way of example only, and not to be taken as limiting the scope of the invention—which is expressed only in the appended claims.

We claim:

1. An efficient, lightweight power transmission system for a hoist that is particularly adapted for raising and lowering cable-suspended scaffolds and the like and that has a housing, such housing comprising two generally parallel walls each having defined in it an aperture to snugly receive one respective section of an output drive shaft of the transmission system; said system comprising:
   - a speed-reducing power transmission mechanism having:
     - a transmission-mechanism case that has two sides disposed between such two walls of the housing,
     - an input drive shaft rotatably mounted in the transmission-mechanism case,
     - mechanical means, within the case, connected to receive torque from the input drive shaft and to produce torque with an increased mechanical advantage and reduced speed,
     - an output drive shaft, connected to receive said torque with increased mechanical advantage and reduced speed from the said mechanical means, and which when driven rotates relative to the case,
     - the output drive shaft being secured to such hoist housing so that in use the case rotates relative to such hoist housing, and the output drive shaft being effectively split in two sections, one extending axially outward from the transmission-mechanism case at each side thereof, and
     - only one of the two output-drive-shaft sections being secured against rotation relative to the corresponding housing wall;
   - drive means, mounted to such housing, for applying torque to the input drive shaft of the transmission mechanism; and
   - a cable-driving sheave secured to and rotated by the case of the transmission mechanism.

2. The system of claim 1 wherein:
   - the input drive shaft is concentric with a particular one of the output-drive-shaft sections; and
   - it is this particular output-drive-shaft section that is secured against rotation relative to the corresponding wall of such housing.

3. An efficient, lightweight power transmission system for a hoist that has a housing and that is particularly adapted for raising and lowering cable-suspended scaffolds and the like; said system comprising:
   - a speed-reducing power transmission mechanism having:
     - a transmission-mechanism case,
     - an input drive shaft that is rotatably mounted in the transmission-mechanism case, and that enters the transmission-mechanism case at one side axially thereof, and has an effective extension at the other side axially of the transmission-mechanism case;
     - mechanical means, within the case, connected to receive torque from the input drive shaft and to produce torque with an increased mechanical advantage and reduced speed, an output drive shaft, connected to receive said torque with increased mechanical advantage and reduced speed from the said mechanical means, and which when driven rotates relative to the case, the output drive shaft being secured to such hoist housing so that in use the case rotates relative to the hoist housing;

drive means, mounted to the housing, for applying torque to the input drive shaft of the transmission mechanism, and comprising a motor, and a manually actuable control for energizing the motor;

a cable-driving sheave secured to and rotated by the case of the transmission mechanism; and a brake that:

is mounted to the hoist housing at the same side of the transmission-mechanism case axially as the input-drive-shaft extension, is coupled to act upon the input-drive-shaft extension, to stop the hoist relative to such cable, comprises actuating spring means for applying braking force to halt the hoist housing relative to the cable, and comprises powered means for overcoming the spring means to permit the hoist housing to move relative to the cable, the powered spring-overcoming means being effectively connected to the manually actuated motor control in parallel with the motor to receive power when the said drive means are operative to drive the hoist relative to the cable.

4. A traction system for use with a hoist that has a housing and that is particularly adapted for raising and lowering a cable-suspended scaffold or the like, and capable of use with any of a selected multiplicity of cable diameters without impairment of traction; said system comprising:

a cable-driving sheave rotatably secured to such housing, and having defined in its periphery a tapered groove of depth sufficient to accommodate any of such selected multiplicity of cable diameters by seating of such cables at a corresponding multiplicity of positions relative to the groove depth;

drive means for forcibly rotating the sheave relative to such housing;

means fixed relative to such hoist housing for guiding such cables into the groove of the sheave; and means, directly or indirectly coupled to such housing, for supporting at least one end of such a scaffold or the like;

a chain-like member disposed around a portion of the circumference of the sheave, connected to be tensioned by weight suspended from the scaffold supporting means, and adapted to press such cable into the groove of the sheave; said chain-like member comprising:

a multiplicity of rollers disposed in a sequence around the portion of the sheave circumference, each roller being enlarged in diameter at its center to extend into the groove of the sheave and diminished in diameter at its ends to radially clear the extreme periphery of the sheave, when any of such selected multiplicity of cable diameters is in use, and a multiplicity of side bars having holes defined in their ends for journalling of the ends of the rollers and for connecting adjacent rollers together in a continuous configuration of links to sustain tension applied to the two ends of the chain-like element, at least some of the side bars being disposed axially outboard of the sheave, at one side or the other of the sheave axially, to axially clear the side of the sheave, and at least some of the side bars extending radially from the periphery of the sheave inward toward the center of the sheave and being axially close to the sides of the sheave, and thereby capturing the sheave closely between them, opposing any tendency for the chain-like member to ride axially off the sheave and also opposing any tendency for such cable, even if damaged, to escape from the sheave.

5. The system of claim 4 wherein:

such selected cable diameters comprise eight through ten millimeters.

6. A traction system for use with a hoist that has a housing and that is particularly adapted for raising and lowering a cable-suspended scaffold or the like along the face of a building, with such cable, housing and scaffold all very close to such building so that it is very undesirable for such housing to extend significantly toward such building from such cable; said system comprising:

a cable-driving sheave rotatably secured to such housing and having defined in its periphery a tapered groove to receive such cable, and being oriented relative to such housing so that in use the axis of rotation of the sheave is generally horizontal and generally parallel to such building;

drive means for forcibly rotating the sheave relative to such housing;

means fixed relative to such hoist housing for guiding such cable into the top of such housing at an entry point which in use is very close to such building, and for guiding such cable substantially directly downward from such point into the groove of the sheave;

a chain-like member disposed around a portion of the circumference of the sheave, connected to be tensioned by weight suspended from the scaffold supporting means, and adapted to press such cable into the groove of the sheave; said chain-like member comprising:

a multiplicity of rollers disposed in a sequence around the portion of the sheave circumference, and a multiplicity of side bars for connecting adjacent rollers together in a continuous configuration of links to sustain tension applied to the two ends of the chain-like element;

means securing one end of the chain-like member to such housing;

a first lever rotatably fixed to such housing and having one end that is secured to the other end of the chain-like member and having a second end that extends, when the traction system is in use, slightly beyond the said entry point of such cable in the direction toward such building; and a second lever rotatably fixed to such housing and pivotally secured to the first lever near the said second end thereof, and extending, when the traction system is in use, beyond the said entry point of such cable in the direction away from such building;

means, directly or indirectly depending from the second lever at a point substantially directly below the said entry point, for supporting at least one end of such a scaffold or the like;

whereby such weight suspended from the scaffold-supporting means is applied to the second lever, and thereby to the first lever, and thereby in turn to the chain-like member, to apply tension to the chain-like member in proportion to the magnitude of the weight; the constant of proportionality being determined by the relative dimensions of the lever arms; and whereby the line of action of such weight in applying tension to the chain-like member is folded over upon itself so that the chain-like member can extend almost to a point that is substantially below the said entry point, but the housing need not extend substantially beyond the said entry point in the direction toward such building.

7. The system of claim 6, wherein:

such hoist housing entry point for such a cable is substantially aligned along a plumb line tangent with the periphery of the sheave, and such hoist housing has a route for such cable passing from the entry point downward into tangential engagement with the sheave, and remaining in engagement with the sheave around substantially three-quarters of the circumference of the sheave to a point generally above the center of the sheave;

the chain-like member is secured to such housing at a point very nearly above the center of the sheave;

the first lever is secured to the chain-like member at a point approximately halfway, along the periphery of the sheave, between the bottom of the sheave and the tangent point of the said plumb line with the periphery of the sheave, whereby the chain-like member engages such cable to press such cable into the groove of the sheave around generally five-eighths of the circumference of the sheave; and the second lever is pivotally secured to the first lever at a point that is at most only very slightly outboard, relative to the sheave, from the said plumb line; and both the point at which the second lever is rotatably fixed to such housing and the point at which the second lever has said scaffold-supporting means suspended from it are inboard, relative to the sheave, from the at-most-very-slightly-outboard point just mentioned;

whereby the scaffold-supporting means are suspended from the second lever at a point substantially along the same said plumb line, but the mechanism need not extend significantly outboard, relative to the sheave, beyond the said plumb line.

8. The system of claim 6 wherein:

such selected cable diameters comprise eight through ten millimeters.

9. The system of claim 7 wherein:

such selected cable diameters comprise eight through ten millimeters.

10. A resettable overspeed braking system for use with a hoist that has a housing and that is particularly adapted for raising and lowering a cable-suspended scaffold or the like, and capable of use with any of a selected multiplicity of cable diameters without impairment of performance; said system comprising:

cable-speed sensing means mounted to such hoist housing, and adapted and disposed to respond to the velocity of such a cable relative to such housing and to provide an actuating signal, and adapted to provide such signal accurately when engaged with such a cable having any of such selected cable diameters;

an automatic trigger mounted to such housing and positioned and adapted to be actuated by the signal from the cable-speed sensing means;

a cam that is rotatably mounted to such housing and provided with spring-loading means that are anchored against such housing; the cam being adapted to be spring-loaded by the spring-loading means toward contact with such cable, and adapted for motion into a cocked position out of contact with such cable, and adapted to be released by the trigger to rotate from the cocked position into contact with such cable;

contact with such cable occurring when the effective radius of the cam is equal to the difference between (1) the intercenter distance between the centerline of such cable and the center of the cam and (2) half the diameter of such cable; the effective radius of said cam being defined as the distance from the center of the cam to that portion of the cable-contacting surface of the cam that is closest to the cable, said effective radius varying with rotational position of the cam; and said cam having a range of effective radii from a first value that is significantly larger than the difference between said intercenter distance and half the smallest one of such selected multiplicity of cable diameters, to a second value that is significantly smaller than the difference between said intercenter distance and half the largest one of such selected multiplicity of cable diameters;

whereby the said range of cable diameters is sufficient to accommodate any of such selected multiplicity of cable diameters; and said system further comprising a backup block that is:

disposed to stop such cable from moving away from the cam when the cam rotates into contact with the cable, and thereby to jam the cable between the cable and the block;

mounted to the housing for motion at an acute angle to the cable, the line of motion being closer to the cable in the direction in which the cam moves to jam the cable, and further away from the cable in the opposite direction; and biased toward the direction in which the cam moves to jam the cable;

whereby the backup block is closest to the cable when the cam rotates into contact with the cable, but tends to withdraw from the cable when the cam and cable are moved in said opposite direction to reset the braking system, thereby lessening the force required to reset the system.

* * * * *